United States Patent [19]
Baker

[11] Patent Number: 4,792,405
[45] Date of Patent: * Dec. 20, 1988

[54] REMOVAL OF HYDROGEN SELENIDE LIQUIDS

[75] Inventor: Daniel C. Baker, Houston, Tex.

[73] Assignee: Shell Oil Company, Houston, Tex.

[*] Notice: The portion of the term of this patent subsequent to Dec. 13, 2005 has been disclaimed.

[21] Appl. No.: 47,397

[22] Filed: May 8, 1987

[51] Int. Cl.⁴ .......................... C02F 1/62; B01D 53/14
[52] U.S. Cl. .................................... 210/721; 210/912; 55/72
[58] Field of Search ............... 210/638, 710, 712, 719, 210/721, 723, 724, 912; 423/210, 508–510; 55/68, 72

[56] References Cited
U.S. PATENT DOCUMENTS

| | | | |
|---|---|---|---|
| 2,039,256 | 4/1936 | Martin et al. | 423/510 X |
| 3,084,994 | 4/1963 | Yomiyama et al. | 423/509 |
| 3,914,375 | 10/1975 | Clark et al. | 423/509 X |
| 3,959,097 | 5/1976 | Queneau et al. | 210/721 X |
| 3,966,889 | 6/1976 | Kakuta et al. | 423/210 X |
| 4,026,797 | 5/1977 | Nikolic et al. | 210/712 X |
| 4,038,376 | 7/1977 | McCoy et al. | 423/510 X |
| 4,055,629 | 10/1977 | Rosenthal et al. | 423/509 |
| 4,405,464 | 9/1983 | Baldwin et al. | 210/724 X |
| 4,432,880 | 2/1984 | Talbot | 210/912 X |
| 4,612,174 | 9/1986 | Fabian et al. | 55/72 X |

Primary Examiner—Tom Wyse

[57] ABSTRACT

Hydrogen selenide is removed from a liquid stream by treatment with a disulfide or polysulfide to oxidize it to elemental selenium.

43 Claims, 1 Drawing Sheet

REMOVAL OF HYDROGEN SELENIDE LIQUIDS

BACKGROUND OF THE INVENTION

1. Field of the Invention

The present invention relates to a process for the removal of hydrogen selenide from liquids.

2. Description of the Art

Each year tens of millions of gallons of contaminated aqueous and non-aqueous solutions are discharged as industrial wastes from chemical, metal processing and mining industries and the like. Due to real as well as potential adverse impacts on processing streams, disposal and environmental concerns, it is desirable to develop methods for removal of such contaminants.

Various processes have been proposed to remove selenium from liquids but principally when it is present in the form of ionic selenium or as selenium metal. It is also important to consider hydrogen selenide, which can be present in liquid streams, including those from chemical processes such as the gasification of coal, and particularly lower quality coal.

SUMMARY OF THE INVENTION

The present invention is directed to a process for the removal of hydrogen selenide from a liquid stream which comprises treating the stream with a disulfide or polysulfide to oxidize the selenide to elemental selenium.

The liquid stream can be any aqueous or non-aqueous stream containing hydrogen selenide as a contaminant. For example, the stream can be an aqueous wash or stripper stream from industrial process or an organic solvent stream and the like. Aqueous streams include wash streams including those containing a sufficient amount of ammonium polysulfide or other additive to remove impurities such as HCN from gas streams as disclosed in U.S. Pat. No. 4,508,693.

In one embodiment of the invention, the stream is an organic solvent stream conventionally used to sorb acidic gases and which has been regenerated to remove the acid gases. Such solvents are conventionally known in the art. Examples of such solvents (sorbents) include (tertiary) amines and aminoalcohols, glycols, glycol ethers, polyols, sulfones, sulfoxides, N-heterocyclics, amides and the like or mixtures thereof, such as diisopropyl amine, methyl diethanol amine, triethanol amine, ethylene glycol, diethylene glycol, glycerol, triethylene glycol, diethyl polyethylene glycol, dimethylformamide, sulfolane, pyrrolidone, N-methyl-pyrrolidone, N-methyl-3-morpholone and the like or mixtures thereof. In one embodiment, the solvent is sulfolane or a mixture thereof with about 40% amine, such as methyl diethanol amine or diisopropyl amine and (about 15%) water, such mixtures commonly known as a Sulfinol solution.

Any disulfide or polysulfide which will oxidize hydrogen selenide to elemental selenium can be used including conventional organic, alkali metal and ammonium di- or polysulfide compounds and the like. The organic disulfides or polysulfides useful in the invention can be aliphatic, aryl, heterocyclic or the like in nature which will not otherwise interfere with the oxidation of selenium and whose residues are conveniently removable from the process system, e.g. by conventional methods, such as solvent regeneration, stripping, biodegradation and the like. In one embodiment of the invention the liquid is treated with sodium or, preferably, ammonium polysulfide solution or equivalent material. These solutions are conveniently aqueous solutions in which the concentration of di- or polysulfide is not critical, but the solutions conveniently have a di- or polysulfide conventration of from about 0.001 to about 1 or, preferably, from about 0.01 to about 0.1 moles per liter. The pH of the solution is usually neutral to basic from about pH of 7 to about 10, preferably from about 8.5 to about 9.5. Alternatively, the di- or polysulfide may be generated in situ by reaction of conventional precursors.

The contacting temperatures are below the decomposition temperatures of the solvent or the di- or polysulfide and accordingly are less than about 150° C., preferably from about 80° C. to about 110° C.

The polysulfide contacting may also be carried out batchwise or continuously, but is preferably carried out continuously. In the case where polysulfide must be added, make-up ammonium or sodium polysulfide (or a mixture thereof) is continuously supplied to the contact or conversion zone, and a portion or "bleed" of solution is removed from the conversion zone. Whether batch or continuous, the contacting and conversion is carried out for a time sufficient to convert at least the bulk of the hydrogen selenide present, or to reduce the concentration of the hydrogen selenide to the level desired or required.

This time may vary with the concentrations and actual temperatures employed. Obviously, longer or shorter residence times may be employed than those suggested hereinafter, it not being intended by the specification of appropriate residence times to limit the invention. In the case of a batch operation, a suitable total reaction or residence time, assuming a well stirred system, may range from a few minutes to several hours, preferably from about 10 minutes to about one hour. In the case of a continuous operation, the contacting and conversion are carried out in such a manner that a given portion of solution in passing through the reaction zone has an average residence time as indicated. If the temperatures of the mixture bled from the stripping zone are suitable (or heating may be employed), the time of the mixture bleed spent in the line or lines from the stripping zone may be included in the total residence time. The total residence time may also include, of course, time spent in the removal line from the contacting or conversion zone. Theoretically, as those skilled in the art will recognize, a "line" may be provided of sufficient length to form the contacting or conversion zone. Turbulent flow reactors may be utilized, or a well stirred vessel is also suitable. The system is preferably closed. Pressures in the conversion zone are not critical, and may range from below atmospheric to 100 atmospheres or more. Preferably, pressures will range from atmospheric to 5 or 10 atmospheres.

Because the treated liquid stream and/or the di- or polysulfide solution after treatment can contain significant volumes of solids, it is preferable to treat such materials before further use or disposal. Accordingly, the selenium (together with any other solids) is removed by flocculation, clarification, centrifuging, thickening and/or filtering. Solid free aqueous solutions can be sent to biological waste treatment.

For example, the invention includes a process for the purification of a gas stream containing hydrogen selenide and acidic gases which comprises (1) contacting the gas stream with an aqueous scrubbing solution to remove at least part of the hydrogen selenide; (2) contacting the scrubbing solution with a disulfide or polysulfide to oxidize the hydrogen selenide to elemental selenium; and (3) contacting the gas stream from (1) with a liquid solvent for the absorption of acidic gases.

The particular type of gaseous stream treated is not critical, as will be evident to those skilled in the art. Streams particularly, suited to removal of $H_2Se$ by the practice of invention are, as indicated, naturally occurring gases, synthesis gases, process gases, and fuel gases produced by gasification procedures, e.g., gases produced by the gasification of coal, petroleum, shale, tar sands, etc. Particularly preferred are coal gasification streams, natural gas streams, and refinery feedstocks composed of gaseous hydrocarbon streams, especially those streams of this type having a low ratio of $H_2Se$ to $CO_2$ and other gaseous hydrocarbon streams, especially those streams of this type having a low ratio of $H_2Se$ to $CO_2$, and other gaseous hydrocarbon streams. The term "hydrocarbon stream(s)", as employed herein, is intended to include streams containing significant quantities of hydrocarbon (both paraffinc and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2Se$ content of the type of streams contemplated will vary extensively, but, in general, will range from about 0.005 percent to about 1 percent by volume and typically about 0.01 percent by volume. Obviously, the amount of $H_2Se$ present is not generally a limiting factor in the practice of the invention.

The solvents include those mentioned above. They are conveniently regenerated by conventional methods known to those skilled in the art to expel acidic gases so that the solvent can be recycled. The solvent may then still contain hydrogen selenide in which case the hydrogen selenide can be removed by the use of disulfide or polysulfide as described herein or by treatment with a heavy metal salt to precipitate heavy metal selenide as described in applicants' concurrently filed U.S. patent application Ser. No. 047,398, filed May 8, 1987, the disclosures of which are incorporated herein by reference.

For example, the invention includes a process for the purification of a gas stream containing hydrogen selenide and acidic gases which comprises (1) contacting the gas stream with a liquid solvent for the absorption of acidic gases; (2) regenerating the loaded solvent to release acidic gases; contacting the solvent from step (2) with a disulfide or polysulfide to oxidize the hydrogen selenide to elemental selenium; and (4) recycling the lean solvent from step (2) to step (1).

Hydrogen selenide is a minor contaminant in, e.g., coal-derived synthesis or fuel gases. Aqueous scrubbing is usually only partially effective in removing hydrogen selenide from said gases and such scrubbing results in unacceptable levels of selenide for discharge. Hydrogen selenide, which is not scrubbed from the gas stream, will accumulate in the solvent of the acid gas treatment system leading to solvent degradation and reduced efficiency in the acid gas treatment system.

In the purification of a gas stream, such as obtained from the gasification of coal, it is possible to integrate the hydrogen selenide removal by use of a process which comprises (1) contacting the gas stream with an aqueous scrubbing solution to remove at least a part of the hydrogen selenide; (2) treating the scrubbing solution with a disulfide or polysulfide to oxidize the hydrogen selenide to selenium; (3) removing the selenium and recycling the aqueous solution to step (1); (4) contacting the gas stream from step (1) with a liquid solvent for the absorption of acidic gases; (5) regenerating the loaded solvent to release acidic gases; (6) treating the lean solvent from step (5) with a disulfide or polysulfide to oxidize the hydrogen selenide to elemental selenium; and (7) removing the selenium and recycling the lean solvent to step (4).

A bleed stream of lean solvent is treated to remove selenium and then returned to the regenerator with acidic gas loaded solvent for removal of mercaptans or sulfides, which are by-products of the oxidation.

Partial combustion or gasification of coal involves reacting the coal at elevated temperatures and possibly elevated pressures with a limited volume of oxygen, the reaction preferably being carried out in the presence of additional agents such as stream, carbon dioxide, or various other materials. Gasification of coal produces a gas, known as synthesis gas, that contains mostly carbon monoxide and hydrogen. Also produced are varying quantities of other gases, such as carbon dioxide and methane, and various liquid and solid materials, such as small particles of ash and carbon commonly known and collectively defined herein as flyslag or flyash. In general, the flyslag or lighter flyash entrained with the gas in partial combustion processes is usually removed from the raw synthesis gas by a combination of cyclones or separators, or a water scrubbing system employing washer coolers, venturi scrubbers, or filters or electrostatic precipitators, or combinations of these systems.

The raw synthesis gas from the gasifier or gasification zone contains, in addition to the aforementioned materials, hydrogen selenide, sulfur-containing gases, such as hydrogen sulfide and carbonyl sulfide, as well as small amounts of inorganic metal sulfides. The presence of these materials and small fines in synthesis gas derived from the gasification of coal complicates removal of additional impurities such as $H_2Se$ and/or $CO_2$, and poses problems insofar as product quality and pollution control requirements are concerned.

The partial combustion of coal to produce synthesis gas, which is essentially carbon monoxide and hydrogen, and particulate flyslag, is well known, and a survey of known processes is given in "Ullmanns Enzyklopadie Der Technischen Chemie", vol. 10 (1958), pp. 360–458. Several such processes for the preparation of hydrogen and carbon monoxide, flyslag-containing gases are currently being developed. Accordingly, details of the gasification process are related only insofar as is necessary for understanding of the present invention.

In general, the gasification is carried out by partially combusting the coal with a limited volume of oxygen at a temperature normally between 800° C. and 2000° C., and preferably at a temperature of between 1050° C. and 2000° C. If a temperature between 1050° C. and 2000° C. is employed, the product gas may contain very small amounts of gaseous side products such as tars, phenols and condensable hydrocarbons. Suitable coals include lignite, bituminous coal, sub-bituminous coal, anthracite coal, and brown coal. Lignites and bituminous coals are preferred. In order to achieve a more rapid and complete gasification, initial pulverization of the coal is preferred. Particle size is preferably selected so that 70% of the solid coal feed can pass a 200 mesh sieve.

The gasification is preferably carried out in the presence of oxygen and steam, the purity of the oxygen preferably being at least 90% by volume, nitrogen, carbon dioxide and argon being permissible as impurities. If the water content of the coal is too high, the coal should be dried before use. The atmosphere will be maintained reducing by the regulation of the weigh ratio of the oxygen to moisture and ash free coal in the range of from about 0.6 to about 1.0, preferably 0.8 to 0.9. The specific details of the equipment and procedures employed form no part of the invention, but those described in U.S. Pat. No. 4,350,103, and U.S. Pat. No. 4,350,103, and U.S. Pat. No. 4,458,607, both incorporated herein by reference, may be employed. Although, in general, it is preferred that the ratio between oxygen and steam be selected so that from 0.1 to 1.0 parts by volume of steam is present per part by volume of oxygen, the invention is applicable to processes having substantially different ratios of oxygen to steam. The oxygen used is preferably heated before being contacted with the coal, preferably to a temperature of from about 200° C. to 500° C.

The details of the gasification reactor system form no part of the present invention, and suitable reactors are described in British Pat. No. 1,501,284 and U.S. Pat. No. 4,022,591. The high temperature at which the gasification is carried out is obtained by reacting the coal with oxygen and steam in a reactor at high velocity. A preferred linear velocity is from 10 to 100 meters per second, although higher or lower velocities may be employed. The pressure at which the gasification can be effected may vary between wide limits, preferably being from 1 to 200 bar. Residence times may vary widely; common residence times of from 0.2 to 20 seconds are described, with residence times of from 0.5 to 15 seconds being preferred.

After the starting materials have been converted, the reaction product, which comprises hydrogen, carbon monoxide, carbon dioxide, and water, as well as the aforementioned impurities, is removed from the reactor. This gas, which normally has a temperature between 1050° C. and 1800° C., contains the impurities mentioned and flyslag, including carbon-containing solids. In order to permit removal of these materials and impurities from the gas, the reaction product stream should be first quenched and cooled. A variety of elaborate techniques has been developed for quenching and cooling the gaseous stream, the techniques in general being characterized by use of a quench gas and a boiler in which steam is generated with the aid of the waste heat. Cyclones or other suitable techniques may be provided for removing particulate solids from the gaseous stream.

BRIEF DESCRIPTION OF THE DRAWINGS

In order to illustrate the invention with greater particularity, reference is made to the accompanying drawing.

DETAILED DESCRIPTION OF THE INVENTION

Figure 1:
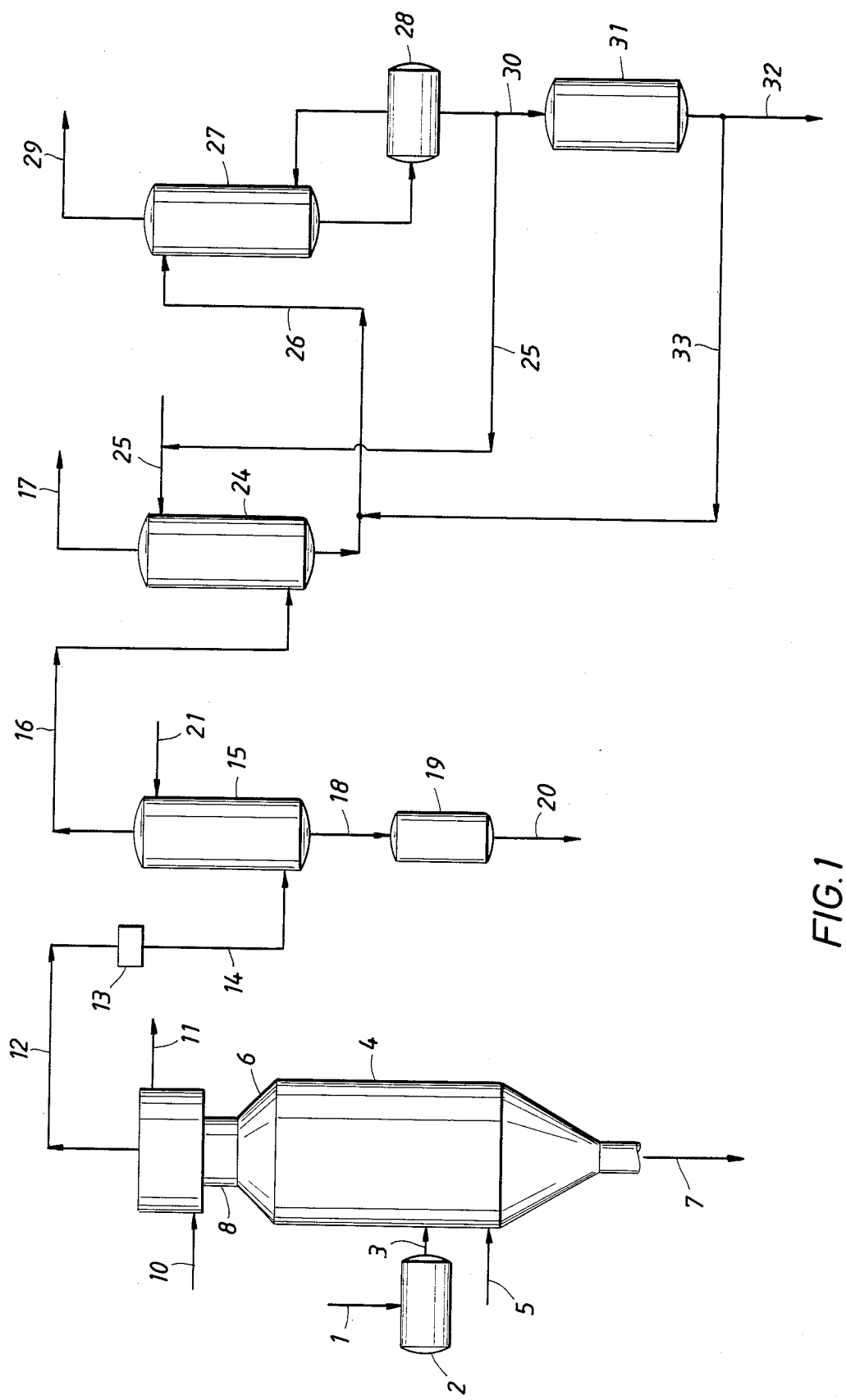
FIG. 1 illustrates a schematic representation of a process for removal of hydrogen selenide from the liquid stream(s) of the type used to purify a gas stream from the partial oxidation of coal by treating the liquid stream(s) with a disulfide or polysulfide to oxidize hydrogen selenide to elemental selenium.

Accordingly, with reference to FIG. 1, pulverulent coal is passed via line (1) into a coal dyer (2) where the coal is dried, suitably at a temperature of about 200° C. The dry coal is subsequently discharged through a line (3) and passes into a gasification reactor (4) where it is gasified at a temperature of about 1500° C. to about 2000° C., a pressure of about 35 atmospheres absolute, with oxygen, which is supplied through a line (5). The gasification produces a product or synthesis gas which is removed from the upper portion (6) of the reactor, and a slag which is removed form the lower portion of the reactor via line (7). The gasification product is removed via conduit (8) where it is quenched and then passed through a boiler or heat exchange zone (9) where it is cooled to a temperature of about 200° C. In the heat exchange (9), water which is supplied through line (10) is converted by indirect heat exchange to high pressure steam, the steam being discharged through line (11). The cooled gasification product is passed through a line (12) to a series of cyclones (13) where the bulk of the particulates (flyslag) is removed and the gasification product is then sent via line (14) to wash in vessel (15) where it is subjected to an aqueous wash, e.g. with water containing sufficient ammonium polysulfide to also remove cyanide when present. The aqueous wash injected via line (21).

The wash from vessel (15) is sent via line (18) to the oxidizing zone (19) wherein it is contacted with a disulfide or polysulfide solution, such as aqueous ammonium polysulfide. The zone (19) is maintained at temperatures, pressures and flow rates sufficient to aid in the oxidation of the hydrogen selenide. While this may vary to some degree depending on the di- or polysulfide used and the constituents in the wash water, such conditions are within the conventional skill of the art. For example, disulfides are generally less reactive than polysulfides, and hydrogen cyanide may compete with hydrogen selenide in the oxidation. (Alternatively, vessel (15) and zone (19) may be incorporated into a single vessel.) Water from zone (19) is sent via line (20) for further processing, e.g. steam stripping, clarification including selenium removal, and biological treatment.

The synthesis gas then passes via line (16) to absorption zone (24) where it is countercurrently contacted with fresh and/or regenerated liquid solvent for the absorption of acidic gases, e.g., a Sulfinol solution injected via line (25).

The sweet gasification product is removed overhead from the absorption zone (24) via line (17) and loaded solvent passes through line (26) into the lower part of regeneration zone (27) where it is heated to expel acidic gases, e.g., by stripping with heat provided by reboiler (28). The acidic gases are removed through line (29).

A portion of solvent solution is removed from reboiler (28) via line (30) and either recycled via line (25) and/or passed to oxidizing zone (31) wherein it is contacted with a disulfide or polysulfide solution, such as aqueous ammonium polysulfide. The zone (31) is maintained at temperatures, pressures and flow rates sufficient to aid in the oxidation of hydrogen selenide to elemental selenium. The elemental selenium is removed via line (32) for disposal or further utilization. The selenium-free solvent is recycled by line (33) to line (26) for regeneration (i.e. removal of sulfides or by-product mercaptans from the oxidation).

While the invention has been illustrated with particular apparatus, those skilled in the art will appreciate that, except where specified, other equivalent or analogous units may be employed. The term "zone", as employed in the specification and claims, includes, where suitable, the use of segmented equipment operated in series, or the division of one unit into multiple units to improve efficiency or overcome size constraints, etc. For example, a series of absorption zones might be employed, with different solvents. Parallel operation of units is, of course, well within the scope of the invention.

What is claimed is:

1. A process for removing hydrogen selenide from a liquid stream which comprises treating the stream with a disulfide or polysulfide to oxidize the selenide to elemental selenium.

2. A process according to claim 1 wherein aqueous sodium or ammonium polysulfide solution is used.

3. A process according to claim 2 wherein aqueous ammonium polysulfide solution is used.

4. A process according to claim 1 wherein the liquid stream is a solvent stream.

5. A process according to claim 4 wherein the solvent is a (tertiary)amine, aminoalcohol, glycol, glycol ether, sulfone, sulfoxide, N-heterocyclic, or amide.

6. A process according to claim 5 wherein the solvent is diisopropyl amine, methyl diethanaol amine, triethanol amine, ethylene glycol, glycerol, diethylene glycol, diethyl polyethylene glycol, dimethyl formamide, sulfolane, pyrrolidone, N-methyl-pyrrolidone or N-methyl-3-morpholone.

7. A process according to claim 6 wherein the solvent is sulfolane or a mixture thereof with methyl diethanol amine or diisopropyl amine, and water.

8. A process according to claim 1 wherein the liquid stream is an aqueous stream.

9. A process according to claim 1 wherein the elemental selenium formed is removed by flocculation, clarification, centrifuging, thickening or filtering.

10. A process according to claim 3 wherein a solvent or aqueous stream is treated.

11. A process for the purification of a gas stream containing hydrogen selenide and acidic gases which comprises (1) contacting the gas stream with an aqueous scrubbing solution to remove at least some of the hydrogen selenide; (2) contacting the aqueous scrubbing solution with a disulfide or a polysulfide to oxidize the hydrogen selenide to elemental selenium; and (3) treating the gas stream from (1) with a liquid sorbent for the absorption of acidic gases.

12. A process according to claim 11 wherein aqueous sodium or ammonium polysulfide solution is used.

13. A process according to claim 12 wherein aqueous ammonium polysulfide solution is used.

14. A process according to claim 11 wherein the liquid stream is a solvent stream.

15. A process according to claim 14 wherein the solvent is a (tertiary) amine, aminoalcohol, glycol, glycol ether, sulfone, sulfoxide, N-heterocyclic, or amide.

16. A process according to claim 15 wherein the solvent is methyl diethanaol amine, triethanol amine, ethylene glycol, glycerol, diethylene glycol, diethyl polyethylene glycol, dimethyl formamide, sulfolane, pyrrolidone, N-methyl-pyrrolidone or n-methyl-3-morpholone.

17. A process according to claim 16 wherein the solvent is sulfolane or a mixture thereof with methyl diethanol amine or diisopropyl amine, and water.

18. A process according to claim 11 wherein the elemental selenium formed is removed by fluctuation, clarification, centrifuging, thickening or filtering.

19. A process according to claim 11 wherein the gas stream is from the partial oxidation of coal, shale or tar sands.

20. A process according to claim 19 wherein aqueous scrubbing solution and the liquid sorbent are both treated with a disulfide or a polysulfide.

21. A process according to claim 20 wherein aqueous ammonium polysulfide is used.

22. A process according to claim 14 wherein the solvent is a (tertiary) amine, aminoalcohol, glycol, glycol ether, sulfone, sulfoxide, N-heterocyclic, or amide.

23. A process according to claim 22 wherein the solvent is sulfolane or a mixture thereof with methyl diethanol amine or diisopropyl amine, and water.

24. A process for the purification of a gas stream containing hydrogen selenide and acidic gases which comprises (1) contacting the gas stream with a liquid solvent for the absorption of acidic gases; (2) regenerating the loaded solvent to release acidic gases; (3) contacting the solvent from step (2) with a disulfide or polysulfide to oxidize the hydrogen selenide to elemental selenium; and (4) recycling the lean solvent from step (2) to step (1).

25. A process according to claim 24 wherein aqueous sodium or ammonium polysulfide solution is used.

26. A process according to claim 25 wherein aqueous ammonium polysulfide solution is used.

27. A process according to claim 24 wherein the liquid stream is a solvent stream.

28. A process according to claim 27 wherein the solvent is a (tertiary) amine, aminoalcohol, glycol, glycol ether, sulfone, sulfoxide, N-heterocyclic, or amide.

29. A process according to claim 28 wherein the solvent is diisopropyl amine, methyl diethanol amine, triethanol amine, ethylene glycol, glycerol, diethylene glycol, diethyl polyethylene glycol, dimethyl formamide, sulfolane, pyrrolidone, N-methyl-pyrrolidone or N-methyl-3-morpholone.

30. A process according to claim 29 wherein the solvent is sulfolane or a mixture thereof with diisopropyl amine and water.

31. A process according to claim 24 wherein the elemental selenium formed is removed by flocculation, clarification, centrifuging, thickening or filtering.

32. A process according to claim 24 wherein the gas stream is from the partial oxidation of coal, shale or tar sands.

33. A process according to claim 24 wherein aqueous scrubbing solution and the liquid sorbent are both treated with a disulfide or a polysulfide.

34. A process according to claim 32 wherein a bleed stream of lean solvent is treated and returned to the solvent regenerator with acidic gases loaded solvent for removal of mercaptans.

35. A process for the removal of hydrogen selenide from a gas stream which comprises (1) contacting the gas stream with an aqueous scrubbing solution to remove at least a part of the hydrogen selenide; (2) treating the scrubbing solution from step (1) with a disulfide or polysulfide to oxidize the hydrogen selenide to elemental selenium; (3) removing the selenium and recycling the aqueous solution to step (1); (4) contacting the gas stream from step (1) with a liquid solvent for the absorption of acidic gases and hydrogen selenide; (5) regenerating the loaded solvent to release acidic gases; (6) treating the lean solvent from step (5) with a disulfide or polysulfide to oxidize the hydrogen selenide to elemental selenium; and (7) removing the selenium and recycling the lean solvent to step (4).

36. A process according to claim 35 wherein aqueous sodium or ammonium polysulfide solution is used.

37. A process according to claim 36 wherein aqueous ammonium polysulfide solution is used.

38. A process according to claim 35 wherein the liquid stream is a solvent stream.

39. A process according to claim 38 wherein the solvent is a (tertiary) amine, aminoalcohol, glycol, glycol ether, sulfone, sulfoxide, N-heterocyclic, or amide.

40. A process according to claim 39 wherein the solvent is diisopropyl amine, methyl diethanaol amine, triethanol amine, ethylene glycol, glycerol, diethylene glycol, diethyl polyethylene glycol, dimethyl formamide, sulfolane, pyrrolidone, N-methyl-pyrrolidone or N-methyl-3-morpholone.

41. A process according to claim 40 wherein the solvent is sulfolane or a mixture thereof with diisopropyl amine and water.

42. A process according to claim 35 wherein the elemental selenium formed is removed by flocculation, clarification, centrifuging, thickening or filtering.

43. A process according to claim 35 wherein the gas stream is from the partial oxidation of coal, shale or tar sands.

* * * * *